Feb. 25, 1941.  H. W. RODDA  2,232,803
MACHINE FOR WASHING, RINSING, AND STERILIZING TABLE
UTENSILS, COOKING AND THE LIKE ARTICLES
Filed April 5, 1938  2 Sheets-Sheet 2

Horace Wyndham Rodda
INVENTOR
By
his Atty.

Patented Feb. 25, 1941

2,232,803

UNITED STATES PATENT OFFICE 2,232,803

MACHINE FOR WASHING, RINSING, AND STERILIZING TABLE UTENSILS, COOKING AND THE LIKE ARTICLES

Horace Wyndham Rodda, West Wimbledon, London, England

Application April 5, 1938, Serial No. 200,096
In Great Britain April 9, 1937

1 Claim. (Cl. 141—9)

This invention relates to machines for washing crockery, silver, cutlery and other tableware, of the kind comprising a tank or hot water container into which the articles are placed and which contains power-driven means for agitating or pumping the water so as to scour the articles.

According to the invention the container has a lateral opening through which the articles to be washed may be slid horizontally on to means adapted to support them above the water level in the container and to rotate them about a horizontal axis, the water being thrown up against the articles by a rotating vaned impeller or paddle partially immersed in the water.

The usual racks or wire baskets may thus be loaded on an adjacent table or draining board and slid directly into and out of the machine, and a great deal of labor and time is evidently saved, as compared with that involved in lifting such loaded racks or baskets into and out of the top opening in existing machines.

Moreover, the invention enables a large machine, for example for hotel and restaurant use, to be constructed on the horizontal conveyor principle, the articles being automatically drawn into the machine through one opening, passed slowly through the container, and fed out through another opening after being washed, all without attention from the operator.

Figure 1:
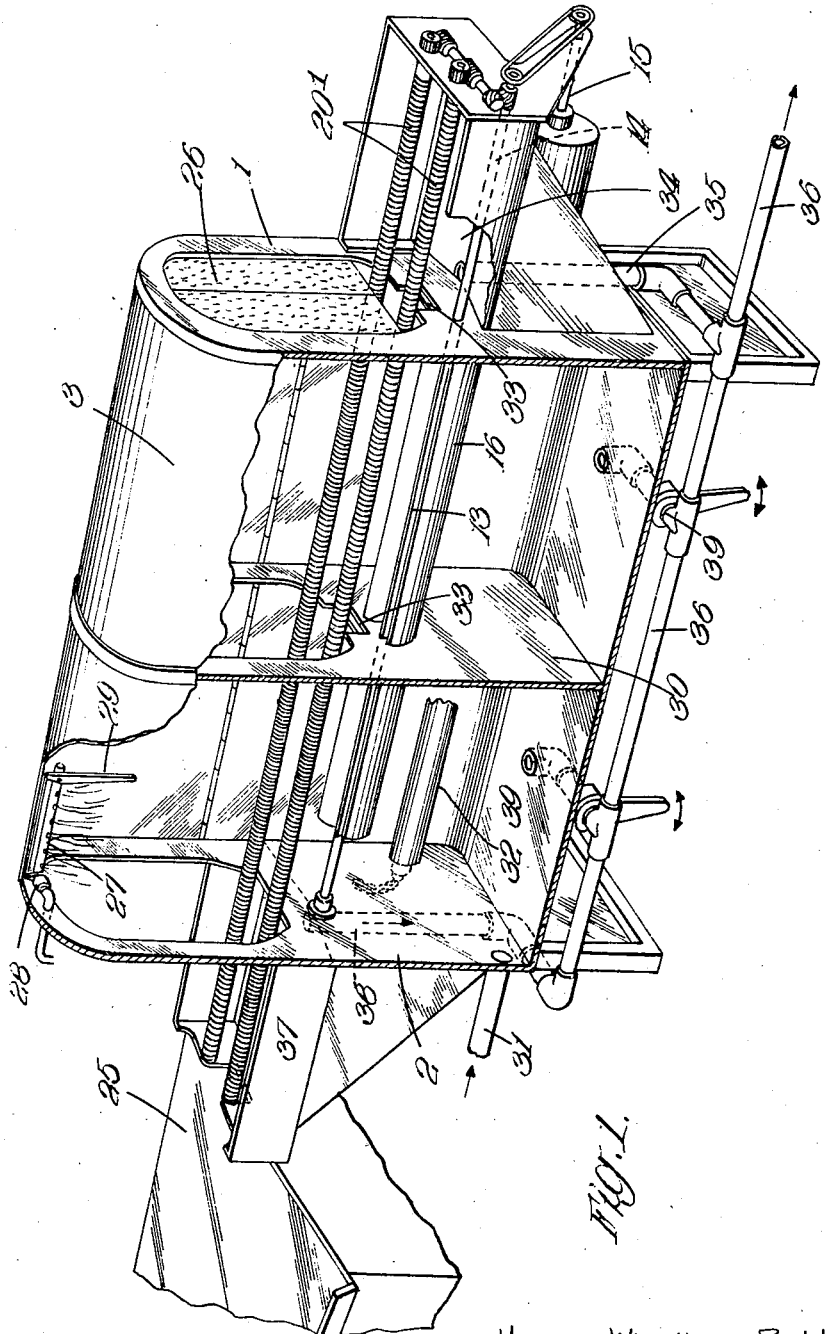

The above and other features of the invention are set out in detail in the following description and illustrated in the accompanying drawings, of which:

Figure 1 of the drawings is a perspective view of the invention with portions broken away to show otherwise hidden parts.

Figure 2:
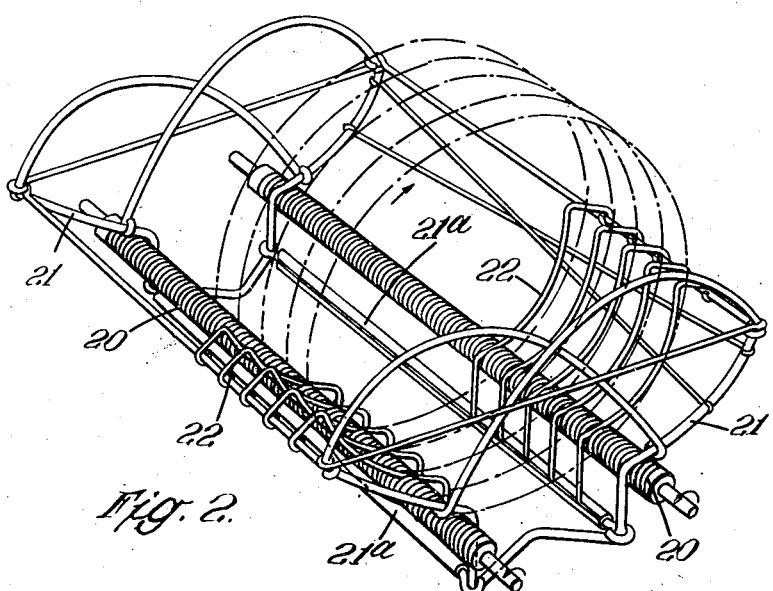

Figure 2 is a perspective view of one form of rack for supporting plates which may be used with the machine shown in Figure 1.

Referring to the drawing, the machine comprises two cast or sheet metal end plates 1 and 2 joined, respectively, to opposite ends of a sheet metal envelope 3 to form a tank or reservoir for the wash water and a hood over the articles being sprayed.

The container is provided with an opening at each end, and the rollers 20' are carried well out to the exterior through each opening and are helically grooved or ribbed so as to engage with the plate rims and the wire frame 21. Plates and saucers to be washed are placed in the rack container shown in Figure 2, which consists of a stout wire frame 21 and thinner wire dividing members 22, between which plates and saucers are placed and rest initially on the bottom longitudinal rails 21a of the frame. When this loaded rack is slid into the machine, the rack becomes cradled on the helical screws 20', as shown. Thus these rollers, besides supporting the loaded rack and rotating the plates therein, also carry the whole steadily through the machine and deliver them on to a suitable table or shelf 25 at the far end. It will of course be understood that wire means for holding silver, cutlery and cups will in this case be provided with suitable annular flanges or ribs for engaging the helical grooves in the rollers 20'. The plate divisions of the basket are so spaced as to correspond to the pitch of the screw of the rollers 20' and therefore the basket and its loaded contents settle down and fit into the grooves of the helical screws. It will be obvious, therefore, that upon the rotation of said helical screws, the loaded basket will be carried directly through the washing machine.

In this construction the entrance opening in the end plate 1 is not provided with a door but is curtained by rubber flaps 26 which are parted by the rack or drum as it is carried in. The escape of spray is therefore minimized, and as in any case this machine would in practice be in continuous operation (i. e. there would be a steady flow of loaded racks and drums through it) no provision is made for intermittently suppressing the action of the impeller 13, its casing 16 being permanently fixed at the best setting for concentrating the spray in the requisite direction.

The impeller 13 terminates somewhat short of the discharge opening in the end plate 2, and the cleaned articles therefore travel a short distance out of the spraying region before emerging from the machine. During this period they are rinsed by clean hot water supplied to an overhead sprinkler 27 through an automatic valve 28 opened when the rack or drum actuates a pivoted lever 29. The impeller 13 is mounted on a shaft 14 and extends substantially the full length of the machine. The shaft 14 is mounted for rotation in the end plates of the machine and passes through the plate at the front of the machine where it is coupled by chain and sprocket gearing to the shaft 15 of a suitable electric drive.

The machine is divided into two compartments by an internal transverse partition 30 provided with the necessary aperture for the passage of the racks, and water is supplied continuously to the second compartment through a pipe 31, being heated by an electric immersion heater 32 or equivalent gas or steam heating means associated with this compartment.

The water level in this compartment is regulated by escape into the other or first compartment over a weir formed by a notch at the bottom of the opening in the partition 30, this notch being provided with a vertically adjustable plate, visible at 33, for obtaining a close adjustment of the weir height.

Level in the first compartment is maintained by a similar but slightly lower weir in the end plate 1, over which the water escapes into a tray 34 under the loading end of the conveyor rollers, and thence passes via a pipe 35 to the general waste pipe 36.

A draining tray 37 is also provided under the discharge end of the rollers 20', and drains via a pipe 38 to the waste pipe 36, and there is provision for draining each compartment to this pipe from time to time via a large-capacity foot-operated valve 39.

With this machine the racks and drums are placed, as they are loaded, on the rollers 20' over the tray 34 and thereafter require no further attention. Each is drawn through the flaps 26 into the first compartment, where it is given a preliminary scouring by relatively dirty water, and passes thence into the second compartment and is washed by the relatively clean water therein. Before emerging from this compartment the loaded rack passes out of the impeller spray and gives itself a shower bath, so to speak, of clean hot rinsing water by actuating the lever 29.

On emergence, the articles drain into the tray 37 and begin to dry by their own heat, finally sliding on to the table 25 ready for removal and re-use.

I claim:

A machine for washing crockery and other tableware, comprising in combination an open-ended container the lower part of which forms a reservoir for washing water, two parallel rollers extending longitudinally above the water level in said container and positively driven in the same sense for supporting and rotating plates and tableware baskets placed thereon, and a rotary vaned impeller at said water level, said rollers projecting through the open ends of said container and being helically grooved to constitute also conveyor means for carrying said plates and baskets therethrough.

HORACE WYNDHAM RODDA.